Patented Nov. 14, 1939

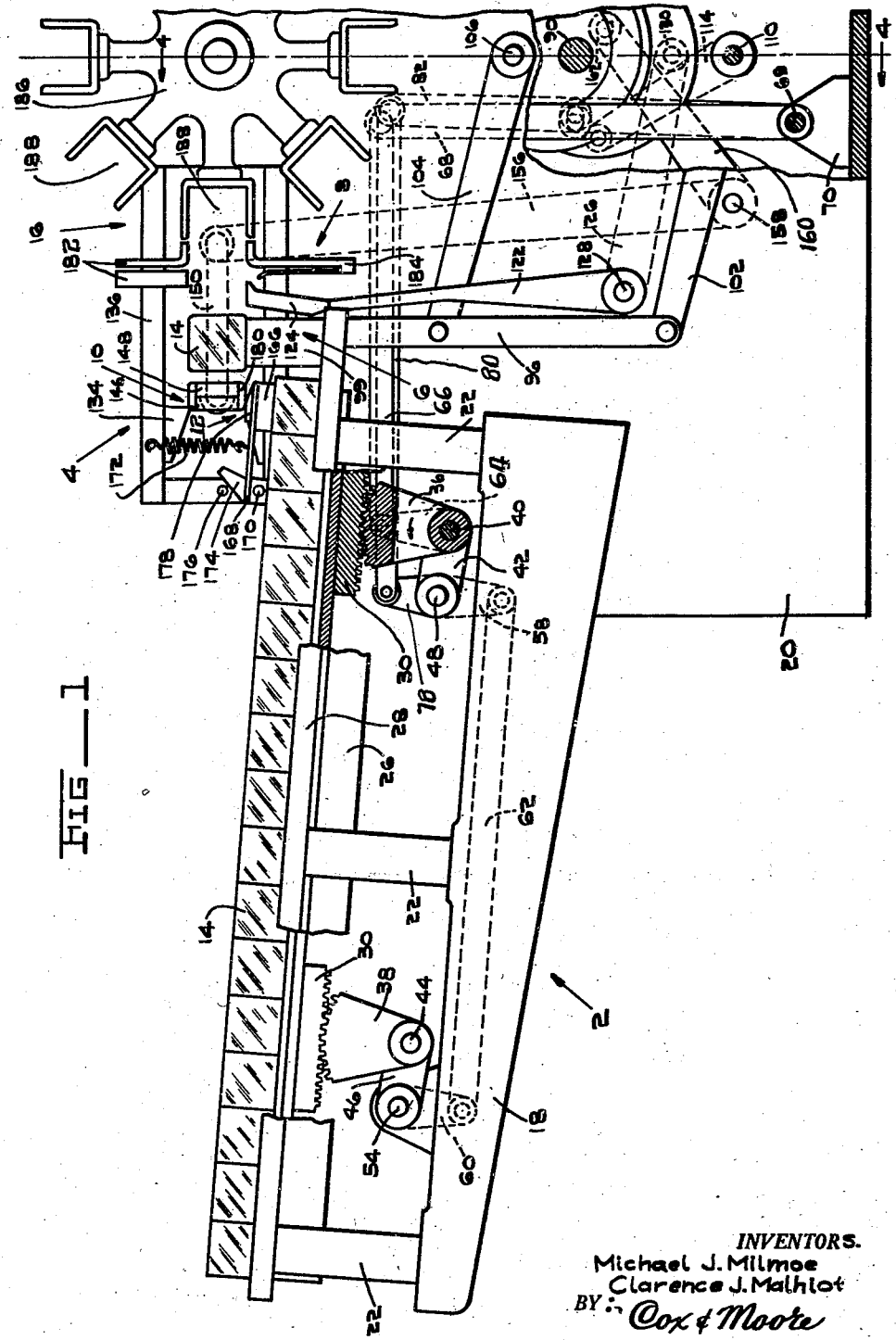

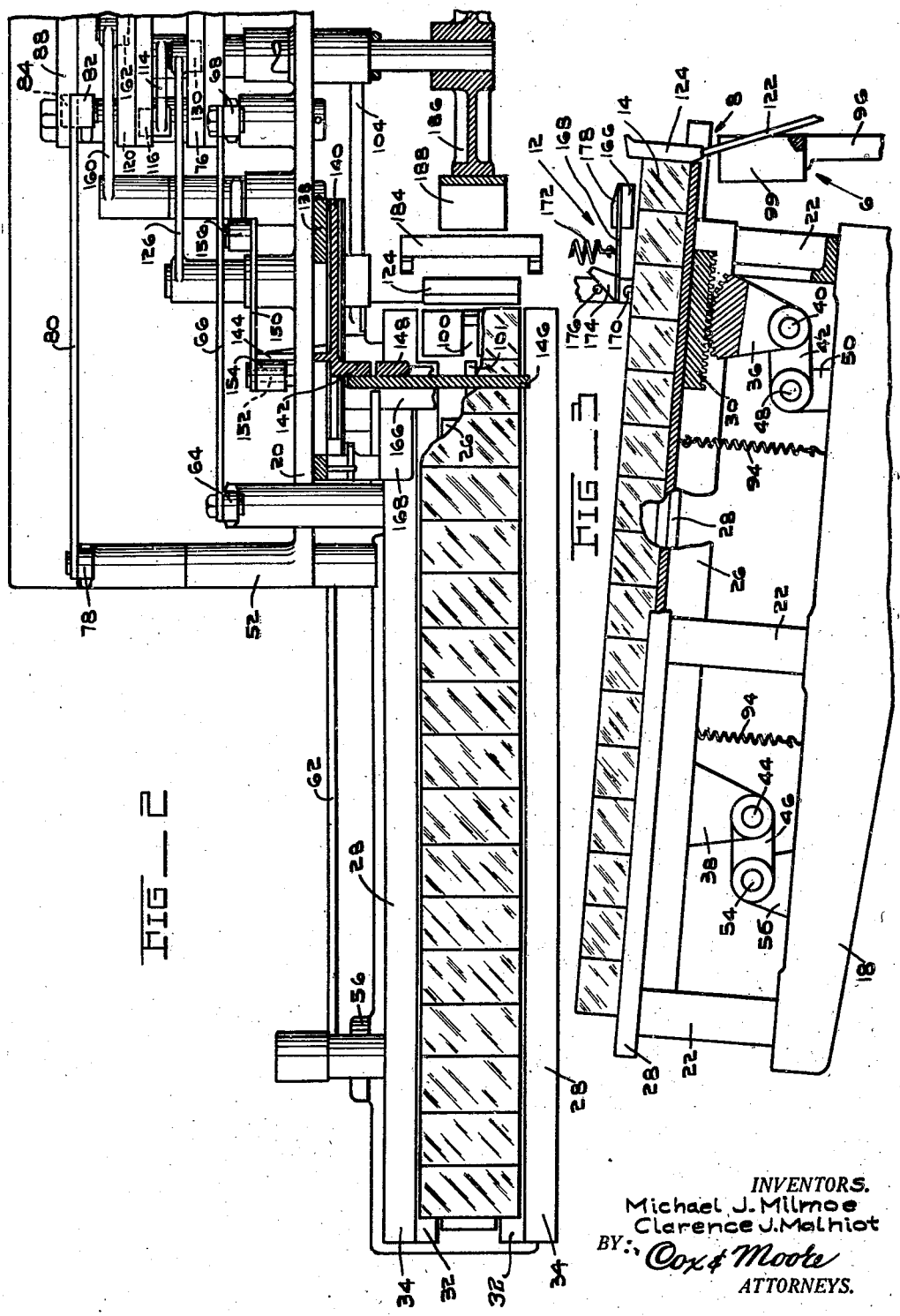

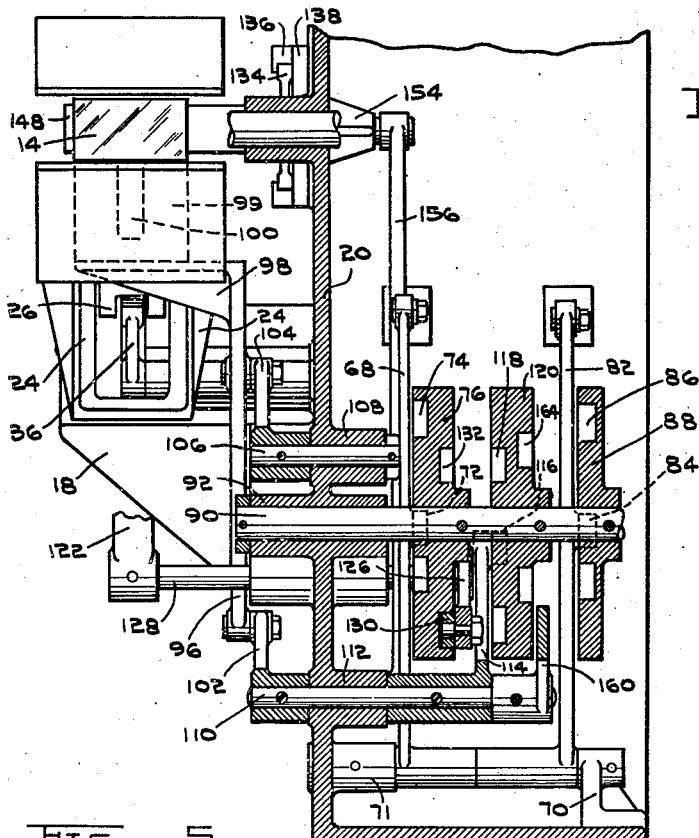

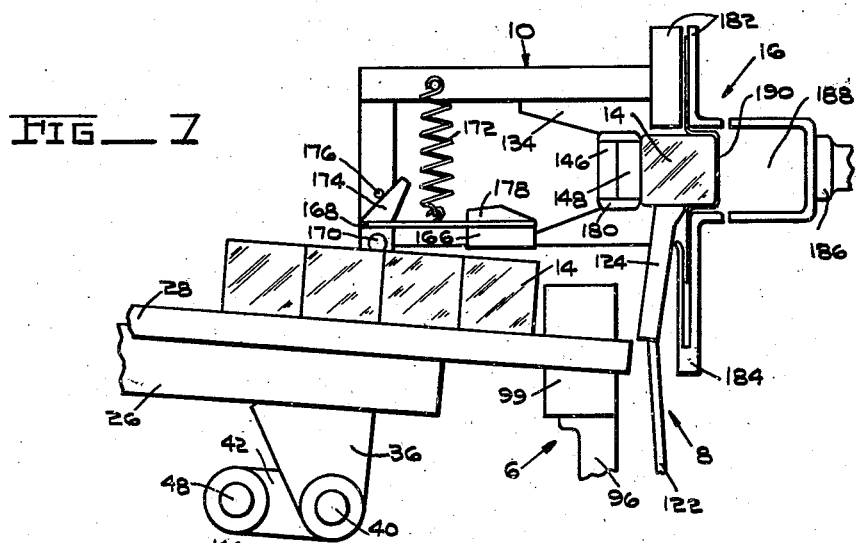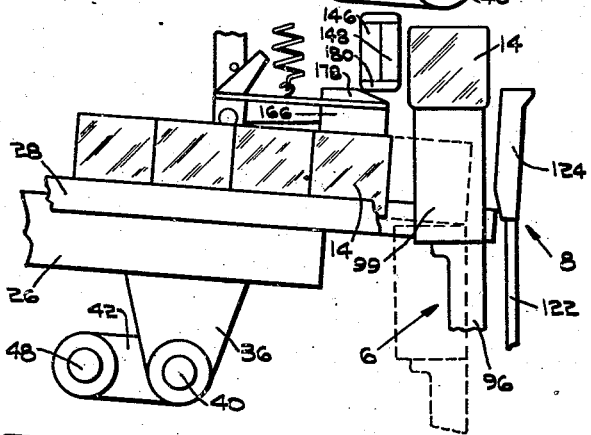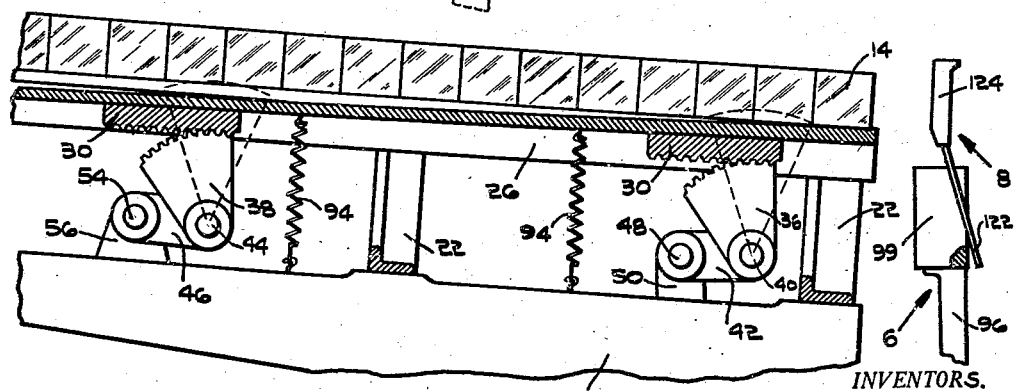

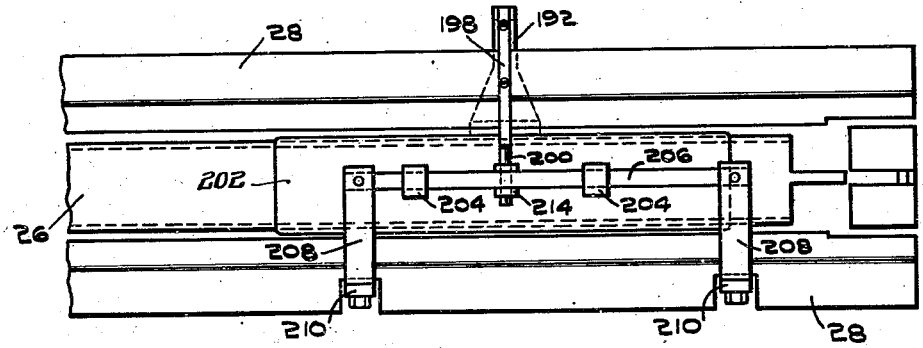
FIG_10
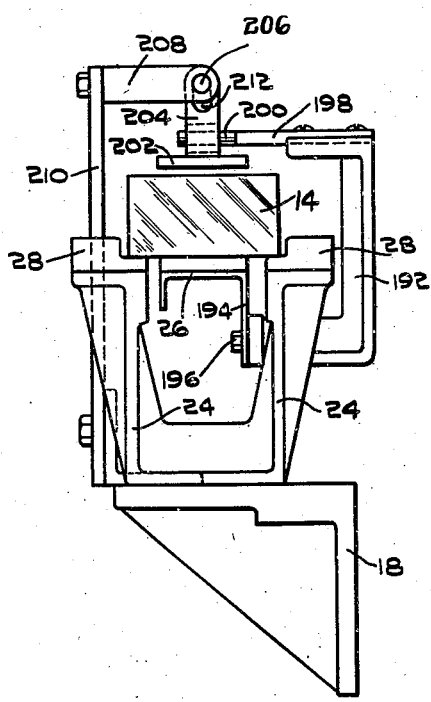
FIG_11
INVENTORS.
Michael J. Milmoe
Clarence J. Malhiot
BY: Cox & Moore
ATTORNEYS.

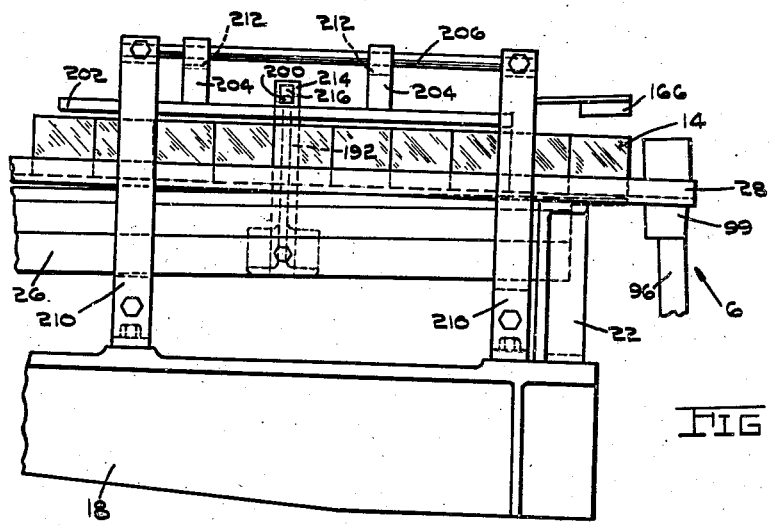
FIG_12
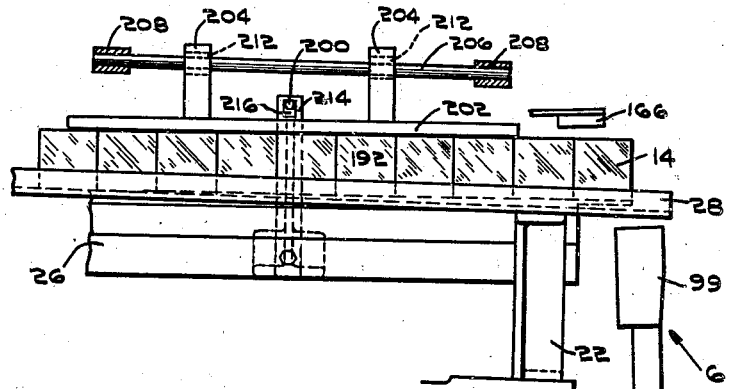
FIG_13
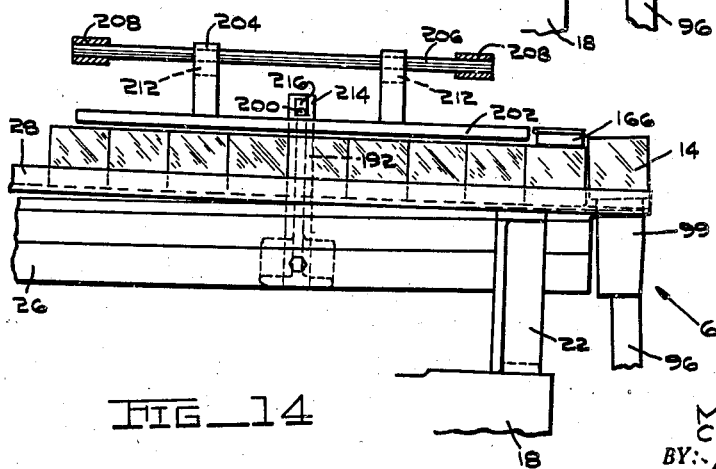
FIG_14
INVENTORS.
Michael J. Milmoe
Clarence J. Malhiot
BY: Cox & Moore
ATTORNEYS.

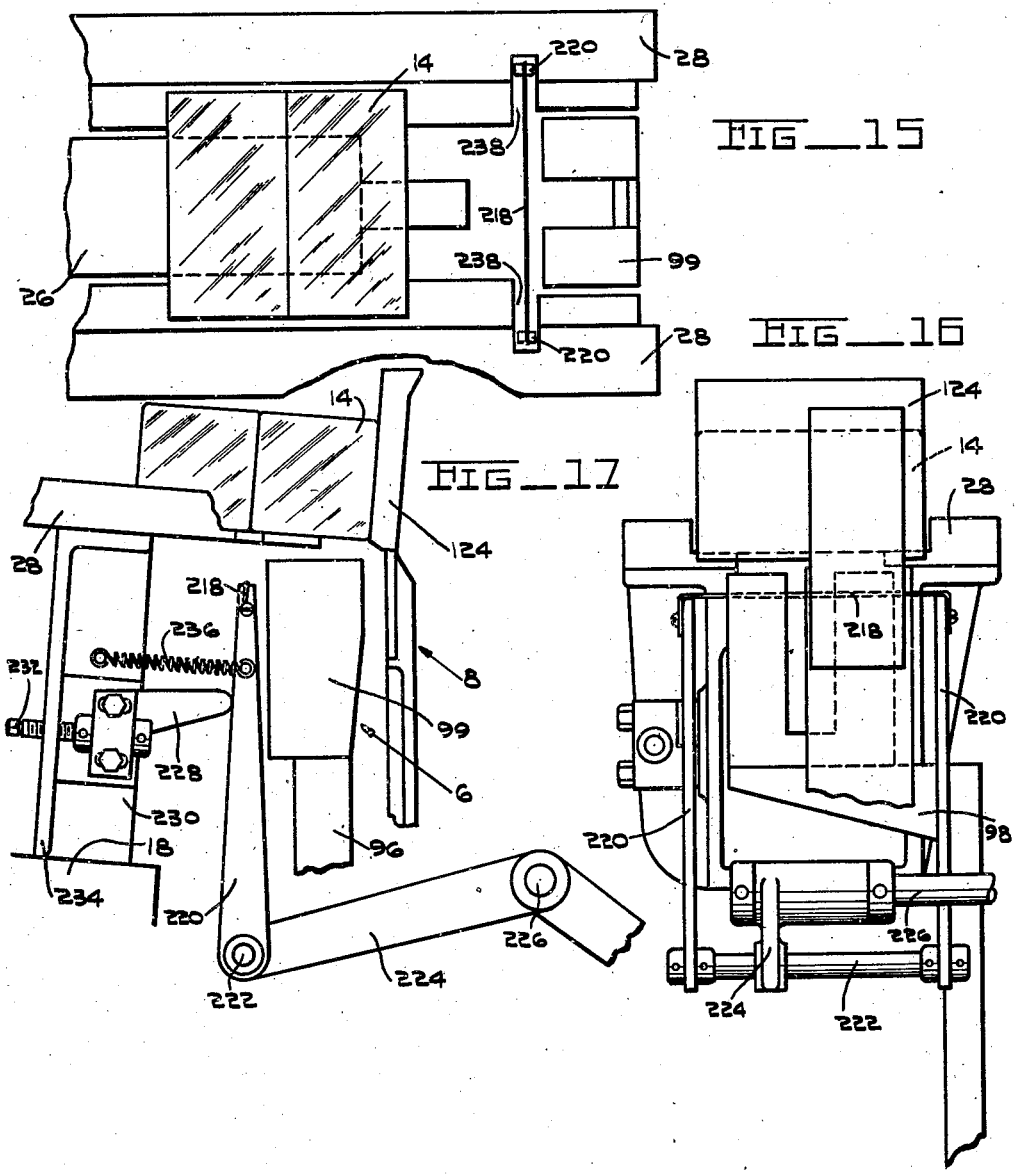

2,180,163

UNITED STATES PATENT OFFICE 2,180,163

BUTTER FEEDER

Michael J. Milmoe, Glen Ellyn, and Clarence J. Malhiot, Oak Park, Ill., assignors to F. B. Redington Co., Chicago, Ill., a corporation of Illinois Application October 2, 1937, Serial No. 167,034

16 Claims. (Cl. 198—24)

This invention relates to wrapping machines in general and more particularly to a mechanism for feeding articles such as prints or blocks of butter, lard or like commodity, to predetermined positions where they may be subsequently packaged and wrapped.

An important object of the invention is to provide simple and efficient transfer mechanisms for feeding prints or blocks of butter, lard or like commodity, from a suitable conveyor to a wrapping mechanism wherein suitable means is provided for effectively separating a block of the commodity to be transferred from its adjacent block.

Another object of the invention is to provide in such transfer mechanism a traveling stop or abutment cooperating with the conveyor to position a block or print of the commodity in the path of a laterally moving transfer means and cooperating with a longitudinally moving, wrapper feed transfer mechanism to transfer the block or print of the commodity from the laterally moving transfer means to the wrapping mechanism.

Another object of the invention is to provide a stop or abutment for the blocks of butter, lard or other similar commodity being transferred, having motion in the direction of movement of the blocks or prints along the conveyor in order that during the transfer of the blocks or prints from the conveyor to the wrapping mechanism the original shape and size of the blocks or prints may be maintained.

Another object of the invention is to provide in combination, an inclined conveyor, a transfer mechanism embodying means to feed the lowermost or leading article to a wrapping mechanism and means to clamp the subsequent line of articles against movement during the transfer of said leading article.

Another object of the invention is to provide a simple and efficient conveyor embodying means moving with the moving element of the conveyor for preventing slippage of the blocks or prints of butter, lard or like commodity, relative to said moving element during the feeding of said commodity along the conveyor.

Other and further objects of the invention will be apparent from the following description when taken with the accompanying drawings, in which:

Fig. 1 is a detail, elevational view of a mechanism for feeding prints or blocks of butter, lard or like commodities and embodying the invention.

Fig. 2 is a detail plan view thereof.

Fig. 3 is a detail, elevational view, partly in section, of the conveyor and a portion of the transfer mechanism.

Fig. 4 is a detail, vertical, sectional view taken substantially on the line 4—4 of Fig. 1, certain parts being broken away for the purpose of clarity in illustration.

Figs. 5, 6, 7, 8 and 9 are detail, vertical, sectional and elevational views showing the different positions of operation of the elements of the feeding mechanism.

Fig. 10 is a plan view of the conveyor equipped with a slippage preventing clamp.

Fig. 11 is an end view of the conveyor shown in Fig. 10.

Figs. 12, 13 and 14 are fragmentary, elevational views showing the operation of the conveyor of Fig. 10.

Fig. 15 is a fragmentary plan view of the conveyor equipped with cutting means for facilitating the severance of the block or print to be transferred, from the adjacent block or print on the conveyor.

Fig. 16 is an end view of the conveyor of Fig. 15.

Fig. 17 is a fragmentary, elevational view of the conveyor of Fig. 15.

The particular feeding mechanism herein disclosed for the purpose of illustrating the invention may be attached to existing machines or it may be incorporated in new machines.

As shown in Fig. 1, this feeding mechanism comprises a conveyor 2 and a transfer mechanism 4 embodying a transversely moving transfer or elevating means 6, a traveling stop or abutment means 8, a longitudinally moving transfer means or pusher 10 and a clamping means 12 for transferring the prints or blocks 14 of butter, lard or like commodity from the conveyor 2 to a wrapping or packaging mechanism 16.

The conveyor 2, which may be of any desired construction, preferably comprises a frame or supporting casting 18 secured in any desired manner to the vertical web or frame 20 of the wrapping machine, the frame 18 supporting a plurality of spaced, upstanding brackets 22. The brackets 22 may be of any preferred construction providing spaced arms 24 (as shown in Fig. 4) to receive therebetween a vertically and horizontally moving conveyor bar 26 and to support spaced side bars or strips 28. The conveyor bar 26 is preferably of an inverted U shape in cross section. The under surface of the base of the inverted U is provided at spaced points with rack bars 30 operated by a suitable mechanism (subsequently to be described) in such a manner as to cause the conveyor bar 26 to reciprocate longitudinally and transversely in the vertical direction relative to the side bars 28. The side bars 28, which may be of any desired material, preferably wood, are L-shaped in cross section, providing base flanges or runners 32 for supporting the prints or blocks of butter on the conveyor, and upstanding flanges 34 for retaining the same in the conveyor against sidewise movement. These side bars or strips 28 extend from the outer end of the conveyor to a point beyond its supporting frame to encompass or receive a portion of the transfer or elevating means 6, the base flanges 32 being cut away at the inner edge of the bars for this purpose (as shown in Fig. 2).

The rack bars 30 operatively engage and are driven by gear segments 36 and 38, the segment 36 being secured to a shaft 40 journaled in and carried by a rocking lever 42 and the segment 38 being pivotally secured to a pin 44 carried by a rocking lever 46. The rocking lever 42 is secured to a shaft 48 journaled in a suitable bracket 50 carried by the base 18 of the conveyor and in the bracket 52 secured to, or formed upon, the machine frome 20. The rocking lever 46 is secured to a stud or shaft 54 journaled in a suitable bracket or brackets 56 carried by the frame 18. The shafts 48 and 54 and the rocking levers 42 and 46 are connected for simultaneous oscillation by cranks 58 and 60 and link 62 pivotally connecting said cranks. The shaft 40 is oscillated to oscillate the gear segment 36 and reciprocate the conveyor bar 26 by a suitable mechanism comprising a crank 64 secured to one end of the shaft 40, a link 66 pivotally connecting the crank 64 to a lever or crank 68. The lever 68 is pivotally supported at its lower end on a rod 69 carried by a bracket 70 secured to the base of the wrapping machine and by a boss 71 formed in the web or frame 20. The lever 68 is provided intermediate its ends with a cam roller 72 engaging the internal cam groove 74 of a rotary, power driven cam 76.

The shaft 48, for oscillating the rocking levers 42 and 46 and thereby raising and lowering the gear segments 36 and 38 and the conveyor bar 26 is driven by a crank 78 secured to one end of the shaft 48 and connected by a link 80 to a crank or lever 82. The lever 82 is pivotally supported at its lower end on the rod 69 and is operated by a cam roller 84 secured to an intermediate portion of the lever and engaging in an internal cam groove 86 of the rotary, power driven cam 88. The cams 76 and 88 for operating the levers 68 and 82 are keyed or pinned to a power driven shaft 90 journaled in a bearing 92 formed in the web or frame 20.

The operation of the conveyor is as follows. The crank or lever 68 is first operated by the cam 76 to oscillate the gear segment 36 in a clockwise direction (as seen in Fig. 1) about the axis of the shaft 40, the forward oscillation of the gear segment 36 causing the conveyor bar 26 to move forwardly relative to the frame of the conveyor and feed prints or blocks 14 therealong. During this forward movement the gear segment 38 pivots idly about the pin 44 and acts as a guide for the rear end portion of the conveyor bar. Toward the end of the forward movement of the bar 26, the cam 88 operates the crank or lever 82 to oscillate the shafts 48 and 54 in a clockwise direction (as seen in Fig. 1) and to lower the gear segments 36 and 38. The rack bars 30 carried by the conveyor bar 26 are maintained in engagement with the segments 36 and 38 by springs 94, (Figs. 3 and 9) each connected at one end to the conveyor bar and at the other end to the frame 18 of the conveyor. The conveyor bar 26, accordingly, follows the downward movement of the segments 36 and 38. Toward the end of the downward movement of the segments 36 and 38 the cam 76 again operates the lever 68 to oscillate the segments in a counterclockwise direction thereby moving the conveyor bar rearwardly. Toward the end of this movement the cam 88 again operates the lever 82 and oscillates the shafts 48 and 54 in a counterclockwise direction thereby raising the segments 36 and 38 and the conveyor bar 26 to their original positions, the forward movement of the conveyor bar beginning just prior to the completion of the counterclockwise oscillation of the shafts 48 and 54.

It should be noted that the longitudinal axis of the lever 46 is angularly inclined relative to the longitudinal axis of the lever 42 (as best seen in Fig. 9). The relative inclination of these axes causes the conveyor bar 26 to engage the foremost prints or blocks 14 prior to the engagement of the trailing prints or blocks. This inclination also causes the forward portion of the conveyor bar to apply a greater feeding force to the leading prints than is applied to the trailing prints.

The transfer or elevating means 6 comprises a bar 96 having at its upper end a laterally extending arm or web 98 (Fig. 4) to which is secured an article engaging block 99, preferably of wood. The block 99 is provided with a vertical central opening or slot 100 (Fig. 2) into which is adapted to extend a finger 101 formed on, and projecting forwardly from, the conveyor bar 26 for facilitating the proper transfer of the leading print from the conveyor to the block 99 in a manner later to be described. The bar 96 is moved in a vertical, substantially rectilinear path by a power operated lever or crank 102 pivotally connected to the lower end of the bar and by the guiding link or lever 104 parallel to the crank 102 and pivotally connected to an intermediate portion of the bar 96. The guiding link or lever 104 is secured to a stud 106 journaled in a bearing 108 formed in the web 20 of the wrapping machine. The crank or lever 102 is secured at its opposite end to a shaft 110 extending through the frame 20 and journaled in a bearing 112 formed therein. The shaft 110 is driven by a crank 114 secured at one end to said shaft and carrying at its other end a cam roller 116 engaging in a cam groove 118 of a rotary, power driven cam 120 secured to the power shaft 90.

The traveling stop or abutment means 8 comprises a bar or lever 122 flattened at its upper end to receive a pad or block 124, preferably of wood, substantially equal in width to the width of the block 99. The upper end of the lever 122 and pad 124 are moved along a substantially horizontal path by a lever or crank 126 secured to a shaft 128 journaled in the machine frame 20 and fastened at its outer end to the lower end of the lever 122. The crank 126 carries at its free end a cam roller 130 which operatively engages the cam groove 132 of the cam 76.

The transfer means or pusher 10 comprises a slide or reciprocating means 134 guided in oppositely disposed slideways 136 of a frame 138 secured to the machine frame 20. The slide 134 may be of any suitable shape providing a base 140 for reception in the slideways 136, a forwardly projecting flange or pusher bar 142 and a rearwardly projecting flange 144 slidably received in suitable guideways or openings provided in the frame 138 and the machine frame 20. The flange or pusher bar 142 has secured thereto, and projecting therefrom, a bar or strap 146 carrying a pusher block 148, preferably of wood. Reciprocating movement is imparted to the slide 134 by a link or lever 150 pivotally secured to a stud or pin 152 carried by a bracket or bearing 154 secured to, or formed upon, the free end of the flange 144. The link or lever 150 is pivotally connected to a long lever 156 secured to one end of a shaft 158 journaled in the machine frame 20, the shaft 158 having secured thereto at its opposite end a crank 160. The crank 160 carries a cam roller 162 which engages in a cam groove 164 of the cam 120.

The clamping means 12 may comprise a clamping plate or bar 166, preferably of wood, secured to a flat bar or lever 168 journaled on a pin 170 secured to the slide frame 138. The plate 166 and lever 168 are normally urged toward an upper, releasing position by a spring 172, or other suitable resilient means, secured to the lever 168 and the frame 138. Movement in the releasing direction is limited by the engagement of an upwardly extending stop finger 174, carried by the lever 168, with a fixed stop pin 176 projecting from the frame 138. The clamping plate 166 is operated automatically by the transfer means or pusher 10 into clamping engagement with the second butter print or like article on the conveyor, thereby to prevent movement of said print during the feeding movement of the transfer or elevating means 6. For this purpose a cam plate or block 178 is provided and is secured to the upper face of the lever 168 adjacent its free end. This cam plate is operated by a metal strap 180 secured to the bottom of the strap 146 and pusher block 148.

The wrapping or packaging mechanism 16, of which a part only is shown for purposes of illustration, may be of any suitable desired type and may comprise wrapper positioning guides 182 and 184 and an intermittently operating wrapping wheel 186 having a plurality of receiving pockets 188. A suitable strip of wrapping material 190 (Fig. 7) may be fed in the customary manner between the guides 182 and into the guides 184 where it remains in position covering the alined pocket 188 of the wrapping wheel 186.

The transfer mechanism 4 operates in suitable timed relation with the operation of the conveyor 2 and the wrapping mechanism 16 and its operation is as follows. It will be assumed for the purpose of description that the original position of the parts is as shown in Fig. 3. In this position the foremost butter print or like article on the conveyor is in engagement with the face of the pad 124 carried by the lever 122. At, or just prior to, the instant that the print engages the pad 124 the lever 122 begins its backward movement in unison with the forward movement of the conveyor bar 26 in order that the print of butter may not be compressed in being transferred to the transfer or elevating means 6, as would be the case were a fixed stop or abutment employed.

As shown in Fig. 3, the clamping plate 166 of the clamping means 12 is in released position, the cam operating strap 180 of the transfer means or pusher 10 being then out of engagement with the cam 178. The transfer or elevating means 6 is at this instant in its lowermost position of rest, in which position the lever 122 extends partially through the central opening 100 of the block 99.

As the pad 124 of the traveling stop or abutment means 8 continues its backward movement and clears the block 99, the transfer or elevating means 6 begins its upward movement and the transfer means or pusher 10 reaches its extreme left-hand position, in which the cam operating stop 180 engages the cam 178 and causes the clamping plate 166 to engage the second butter print or like article on the conveyor. In its upward movement the block 99 engages the foremost print of butter 14 carried by the projecting finger 101 of the conveyor bar 26 which at this instant projects into the central opening 100 of the block 99. It should be observed that, as shown in Fig. 5, the plane of the upper edge of the block 99 at the instant of engagement with the print 14 is inclined relative to the plane of the lower edge of the print 14; or, in other words, the block 99 first engages the print 14 adjacent its forward edge. It has been observed that in feeding prints or blocks of butter or like articles, adjacent ones tend to become more or less stuck together and applicant has discovered that by causing the block 99 to engage the foremost print in the manner just described, the shearing or separation of this print from the second print is facilitated since it imparts to the foremost print a force tending to rotate it about its upper, left-hand edge.

The next instantaneous position of the parts is as shown in Fig. 6. It will be seen from this figure that the foremost butter print 14 has just been separated from the second print and that the conveyor bar 26 has already begun its downward movement. It will also be seen that the pad 124 of the traveling stop or abutment means 8 has begun to draw away from the print or block 14 now carried solely by the block 99 of the transfer or elevating means 6. From the position shown in Fig. 6, the parts move to the position shown in Fig. 8, the transfer or elevating means 6 continuing its upward movement and the traveling stop or abutment means 8 continuing its backward movement.

As shown in Fig. 8, the block 99 is approaching its uppermost position and the pad 124 is in an intermediate rest position, having sufficiently cleared the print 14 being fed to permit its free, unhampered, vertical movement with the block 99. From this position the block 99 moves to its uppermost rest position shown in Fig. 1. The slide 134 of the transfer means or pusher 10 then begins its forward movement. It should be observed that in this position the upper surfaces of the block 99 and pad 124 lie in a substantially common plane. As the block 148 moves forwardly it pushes the print 14 from the block 99 onto the pad 124, which, at the proper instant, moves rearwardly from its intermediate rest position in unison with the movement of the block 148 thereby facilitating the transfer of the print 14 from the transfer or elevating means 6 to the wrapping or packaging mechanism 16.

From the position shown in Fig. 1 the parts move to the position shown in Fig. 7, in which the pad 124 has moved to its rearmost rest position and the pusher block 148 in moving forwardly is forcing the print 14 past the wrapper strip 190 and into the receiving pocket 188 of the wrapping wheel 186, the wrapper strip 190 being folded about the print of butter 14.

As shown in Fig. 7, the block 99 of the transfer or elevating means 6 is now moving downwardly toward its original position shown in Figs. 3 and 9. The print 14 having been fed into the receiving pocket 188, the transfer means or pusher 10 begins its rearward movement and the traveling stop or abutment 8 begins its forward movement.

Fig. 9 shows the position of the conveyor bar 26, the block 99 and the pad 124 as the latter moves forwardly to engage the next subsequent print or block on the conveyor. It will be seen that during the forward movement of the conveyor bar 26 it is raised to engage the line of butter prints resting on the side strips or bars 28 of the conveyor. As previously stated, the conveyor bar 26 first engages and lifts the foremost block from the side bars of the conveyor and the point of engagement progressively passes backward along the conveyor to lift the succeeeding prints or blocks. The conveyor bar 26 then, toward the end of its raising movement, begins to move forwardly and approach the forwardly moving pad 124. During this raising and forward feeding movement of the conveyor bar 26, the transfer means or pusher 10 is moving rearwardly but does not engage the cam 178 of the clamping means 12 until the conveyor bar 26 has moved to its extreme forward position.

Under certain circumstances the characteristics of the butter or like commodity being fed may be such that slippage between the conveyor bar 26 and the articles being fed may interfere with the proper feeding of said articles. In order to prevent such excessive slippage the traveling clamp or auxiliary feeding device (shown in Figs. 10 to 14) may be provided. This traveling clamp or auxiliary feeding device comprises a generally U-shaped bracket 192 adjustably secured to an extended leg or flange 194 of the inverted U-shaped conveyor bar 26 in any suitable manner, as by a bolt 196, permitting vertical adjustment of the bracket 192. A bar 198, having a cylindrical end portion 200, is secured to the upper end of the bracket 192 and extends over the articles on the conveyor. An elongated clamping bar 202 of a predetermined weight sufficient to apply the desired amount of slippage preventing force to articles on the conveyor, is mounted by brackets 204 on a rod or bar 206. The bar 206 is mounted in a fixed position in the vertical plane passing through the central, longitudinal axis of the conveyor by brackets 208 carried by supporting bars 210 fastened at their lower ends to suitable brackets secured to the conveyor frame 18. The brackets 204 which support the pressure or clamping plate 202 on the rod 206 are provided with slots 212 for receiving the bar 206 and for permitting these brackets and the bar 202 to have a limited vertical movement relative to the bar 206.

The bar 198 carried by the bracket 192 is secured to the pressure or clamping bar 202 by a bracket 214 having a slot 216 for receiving the end portion 200 of the bar 198 to permit a certain degree of lost motion between said bar 198 and the pressure or clamping bar 202. The length of the slot 216 is such as to limit the relative movement between the pressure clamping plate 202 and the prints of butter 14 to a desired degree, thereby to prevent any substantial compression of the butter by the clamping bar.

The operation of this traveling clamp or auxiliary feeding device is as follows. When the conveyor bar 26 is in its position shown in Fig. 12, in which position it is just beginning its feeding movement upwardly and to the right, the prints or blocks of butter 14 rest upon the side bars 28 of the conveyor. The pressure or clamping plate 202 is supported on the rod 206 by the brackets 204 and is spaced thereby a slight distance from the prints or blocks on the conveyor.

As the conveyor bar 26 moves upwardly and raises the prints off the conveyor side bars 28, the prints or blocks engage the pressure or clamping plate and free it from its supporting bar 206, the bar 206 moving relatively downwardly in the slots 212 of the brackets 204. As the prints or blocks of butter engage the bar 202, the end portion 200 of the bar 198 moves relatively upwardly in the slot 216 of the bracket 214 and in reaching the top of the slot prevents any substantial compression of the butter by the bar 202, while at the same time permitting sufficient pressure to be applied thereby to prevent slippage of the butter relative to the conveyor bar 26. The conveyor bar 26 in completing its upward movement begins to move forwardly toward the transfer or elevating means 6 and this forward movement of the conveyor bar is transmitted to the pressure or clamping bar 202 through the bracket 192, the bar 198 and the bracket 214.

Having completed its forward movement and having deposited the foremost print or block of butter upon the transfer or elevating means, the conveyor bar 26 moves downwardly and the pressure or clamping bar 202 moves downwardly therewith until it is again supported on the bar 206, the end portion 200 of the bar 198, then moving downwardly in the slot 216 of the bracket 214. During the subsequent backward movement of the conveyor bar 26, the brackets 204 and the clamping bar 202 slide rearwardly along the bar 206 in unison with the conveyor bar.

Under certain circumstances and where the prints of butter or like commodity to be wrapped are of a particularly sticky nature, the individual prints may adhere to one another to such an extent that completely satisfactory separation thereof might not be accomplished by the transfer or elevating means 6 (shown in Figs. 1 to 9). Where such is the case the auxiliary severing device of Figs. 15 to 17 may be provided. The auxiliary severing device comprises a small wire or knife 218 secured at its ends to parallel bars 220 mounted upon, and pivotally connected to, the transverse rod 222 carried by a link or lever 224 secured to an operating shaft 226. The operating shaft 226 may be journaled in any suitable manner on the frame of the wrapping machine and may be operated in proper timed relation to the operation of the transfer or elevating means 6 by any suitable cam mechanism (not shown).

Means are provided for precisely adjusting the wire or knife 218 to cause it to sever the foremost print from the next adjacent print along the plane of previous separation of the prints. This means comprises a gauge bar or finger 228 adapted to engage one of the parallel bars 220 and carried by a bracket 230 mounted on one end of an adjusting screw 232 threadedly engaging a laterally projecting flange 234 formed on the conveyor frame 18. A spring 236 secured at one end to the last mentioned bar 220 and secured at its other end to the conveyor frame maintains said bar 220 in constant engagement with the gauge bar or finger 228.

The parallel bars 220 and the severing wire or knife 218 pass across the conveyor side bars 28 through openings 238 provided therein. Where the transfer mechanism is equipped with the auxiliary severing device of Fig. 15 to 17 the cams for operating the transfer or elevating means 6 and the traveling stop or abutment means 8 must be modified to provide a short lull period following the first engagement of the elevating block 99 with the foremost print or block on the conveyor bar 26 in order that the conveyor bar may move rearwardly and clear the path of movement of the severing wire or knife 218 before any substantial lifting force is supplied by the transfer or elevating means 6. The conveyor bar 26 having cleared the path of movement of the wire 218, the latter is moved upwardly to sever the foremost print from the next adjacent print. The transfer or elevating means 6 moves upwardly to lift the foremost print as the wire 218 moves upwardly between the foremost and next adjacent print and the traveling stop or abutment means 8 continues its rearward movement to clear the print now positioned on the block 99 and permit its free lifting by the transfer or elevating means.

It will be seen from the above description that applicant has provided a relatively simple and quite efficient transfer mechanism for feeding blocks of butter, lard, or like commodity from a conveyor to a wrapping or packaging mechanism, said transfer means being provided with a stop or abutment means for maintaining the original shape of the butter or like commodity.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. A mechanism for feeding units of butter or like commodity to a wrapping mechanism, comprising a conveyor, a stationary guide for said units adjacent to and extending longitudinally of the conveyor, means movable transversely of the conveyor for transferring a unit therefrom to a predetermined position, stop means movable relative to the conveyor and into engagement with the unit to be transferred for positioning said unit on said transfer means, a second transfer means movable transversely with respect to the path of movement of the first transfer means for feeding said unit from the first transfer means to the wrapping mechanism and means operatively controlled by said second transfer means for clamping the adjacent unit to said guide during feeding movement of said first transfer means.

2. A mechanism for feeding units of butter or like commodity to a wrapping mechanism, comprising a conveyor, means movable transversely of the conveyor for transferring the unit therefrom to a predetermined position, means for moving the conveyor to feed said unit to said transfer means, movable abutment means, means for causing said abutment means to move in unison with said conveyor first in a direction toward said conveyor into engagement with said unit and then in the same direction as said conveyor for positioning said unit on said transfer means, and a second transfer means movable transversely of the path of movement of the first transfer means for feeding said unit from said first means to the wrapping mechanism, the upper surface of said abutment means forming a guide for the unit during feeding thereof by said second transfer means thereby properly to position said unit in said wrapping mechanism.

3. A mechanism for feeding units of butter or like commodity to a wrapping mechanism, comprising a conveyor having a longitudinally movable element, and a relatively fixed guide for said units adjacent to and extending longitudinally of the movable element, elevating means movable transversely of the conveyor for receiving and transferring a unit therefrom to a predetermined position, movable stop means, means for causing said stop means to be moved initially toward said conveyor and into engagement with said unit and then in the same direction as the movable element of the conveyor for positioning said unit on said elevating means, a second transfer means movable transversely with respect to the path of movement of said elevating means for feeding said unit from said elevating means to the wrapping mechanism and means operatively controlled by said second transfer means for clamping the adjacent unit on said guide during feeding movement of said first transfer means.

4. A mechanism for feeding units of butter or like commodity to a wrapping mechanism, comprising a conveyor having a longitudinally movable element, and a transfer mechanism for successively receiving and feeding units from said conveyor to said wrapping mechanism, said transfer mechanism comprising elevating means for transferring a selected unit from the conveyor to a predetermined position, pusher means movable laterally of said elevating means for feeding a unit from said elevating means to said wrapping mechanism and clamping means operated by said pusher means for clamping the next adjacent unit on said conveyor during movement of the elevating means.

5. In a mechanism for transferring articles from a moving conveyor, the combination of stop means cooperating with the moving conveyor for moving said articles to a predetermined position for withdrawal from the conveyor and power actuated means for moving said stop means during movement of the conveyor first in a direction opposite to the direction of movement of the conveyor to contact an article thereon and then in the same direction as the conveyor properly to position said article in said predetermined withdrawal position.

6. A mechanism for feeding units of butter or like commodity to a wrapping mechanism, comprising a conveyor, means movable transversely of the conveyor for transferring the unit therefrom to a predetermined position, means for moving the conveyor to feed said unit to said transfer means, pressure applying means for clamping said units on said conveyor during its feeding movement to prevent slippage of the units relative thereto, movable abutment means, power actuated means for causing said abutment means to move first in a direction toward said conveyor into engagement with said unit and then in the same direction as said conveyor for positioning said unit on said transfer means, and a second transfer means movable transversely with respect to the path of movement of the first transfer means for feeding said unit from said first means to the wrapping mechanism, said abutment means forming a guide cooperating with said second transfer means properly to position said unit in said wrapping mechanism.

7. A mechanism for feeding units of butter or like commodity to a wrapping mechanism, comprising a conveyor, means movable transversely of the conveyor for transferring the unit therefrom to a predetermined position, means for moving the conveyor to feed said unit to said transfer means, pressure applying means for clamping said units on said conveyor during its feeding movement to prevent slippage of the units relative thereto, movable abutment means, means for causing said abutment means to move first in a direction toward said conveyor into engagement with said unit and then in the same direction as said conveyor for positioning said unit on said transfer means, means operable in timed relation to said transfer means for separating at least partially the face of the next adjacent unit from the adhering face of the unit to be transferred, and a second transfer means movable transversely with respect to the path of movement of the first transfer means for feeding said unit from said first means to the wrapping mechanism, said abutment means forming a guide cooperating with said second transfer means properly to position said unit in said wrapping mechanism.

8. A mechanism for feeding units of butter or like commodity to a wrapping mechanism, comprising a conveyor having a longitudinally movable element, elevating means movable transversely with respect to the path of movement of said longitudinally movable element for receiving and transferring a unit therefrom to a predetermined position, vertically movable cutting means operable in timed relation to said elevating means for breaking the unit to be transferred from the next adjacent unit, movable stop means, and means for causing said stop means to be moved first in a direction toward said conveyor and into engagement with said unit and then in the same direction as the movable element of the conveyor for positioning said unit on said elevating means.

9. A mechanism for feeding units of butter or like commodity to a wrapping mechanism, comprising a conveyor having a longitudinally movable element, elevating means movable transversely with respect to the path of movement of said longitudinally movable element for receiving and transferring a unit therefrom to a predetermined position, movable stop means, means for causing said stop means to be moved first in a direction toward said conveyor and into engagement with said unit and then in the same direction as the movable element of the conveyor for positioning said unit on said elevating means, and a second transfer means movable transversely with respect to the path of movement of said elevating means for feeding said unit from said elevating means to the wrapping mechanism, said stop means being so positioned relative to said second transfer means that the upper surface of said stop means forms a guide for the unit during feeding thereof by said second transfer means.

10. A mechanism for feeding precut units of butter or like substance in individual succession, said mechanism comprising a conveyor having a longitudinally and transversely movable bar for supporting and feeding said units in face-to-face, abutting relation, a substance transfer member on which the leading unit carried on the forward end of said bar is deposited by said bar, said substance transfer member having an opening therein to receive the forward end of the bar and to permit relative movement between said member and bar and means for moving said substance transfer member along a transverse path at an acute angle to the path of movement of said bar to cause said member to engage and angularly shift the leading unit relative to the second unit whereby to break the adhering bond between said leading unit and said second unit.

11. A mechanism for feeding precut units of butter or like substance in individual succession, said mechanism comprising a conveyor having a longitudinally and transversely movable bar for supporting and feeding said units in face-to-face, abutting relation, a substance transfer member having a substance engaging surface on which the leading unit carried on the forward end of said bar is deposited by said bar, said substance transfer member having an opening therein to receive the forward end of the bar and to permit relative movement between said member and bar, and means for reciprocating said substance transfer along an arcuate path transversely to said bar in such manner that the substance engaging surface initially engages a face of the leading unit at a point remote from the face abutting the second unit whereby to cause the leading unit to be angularly shifted relative to the second unit thereby to break the adhesive bond between the leading unit and the second unit.

12. A mechanism for withdrawing precut units of butter or like substance from a conveyor along which the units are fed in face-to-face, abutting relation and tend to stick together, said mechanism comprising a shiftable transfer member having a substance supporting surface adapted to extend angularly to the corresponding face of the selected unit to be transferred during initial engagement therewith, means for shifting said transfer member to cause the selected unit to be shifted by said surface angularly relative to the next adjacent unit whereby to break said selected unit from said next adjacent unit, a cutter positioned to cooperate with said transfer member in breaking the next adjacent unit from the selected unit, and means operable in timed relation to said transfer member for moving said cutter a short distance between said units along their abutting faces whereby to facilitate the breaking of the selected unit from the next adjacent unit.

13. A mechanism for feeding precut units of butter or like substance in individual succession, said mechanism comprising a conveyor having an oscillating feed bar feeding a line of units in face-to-face, abutting relation, a transfer member having a substance engaging surface to receive the leading unit from said bar, a shiftable abutment, means for actuating said shiftable abutment first in a direction opposite to said feed bar to contact the leading unit thereon and then in the same direction as the feed bar while still in contact with said unit thereby properly to position said unit upon said transfer member, driving means for moving said transfer member into initial engagement with said leading unit with the substance engaging surface of said member contacting a face of said unit at a point remote from the face abutting the second unit and extending at an angle to said contacting face, means included in said abutment actuating means for shifting said abutment out of contact with said leading unit when said unit is engaged by said transfer member, said driving means being thereafter operative to move said transfer member transversely to said feed bar to shift the leading unit angularly relative to the second unit thereby to break any bond of adherence between said leading and said second units and to transfer the leading unit to a predetermined position.

14. A mechanism for feeding precut units of butter or like substance in individual succession, said mechanism comprising a conveyor having a longitudinally and transversely shiftable feed bar for feeding a line of units in face-to-face, abutting relation, a transfer member shiftable transversely to the feed bar, said member comprising a block having a substance engaging surface to receive the leading unit from said bar and being slotted to permit movement of said bar longitudinally and transversely through said block to deposit said unit on said surface, an abutment shiftable above the transfer member, means for actuating said shiftable abutment first in a direction opposite to the movement of the feed bar to contact the leading unit thereon and then in the same direction as said feed bar while still in contact with said unit thereby properly to position said unit on said transfer member, driving means for moving said block into initial engagement with said leading unit with the substance engaging surface of said member contacting a face of said unit at a point remote from the face abutting the second unit and extending at an angle to said contacting face, means included in said abutment actuating means for shifting said abutment out of contact with said leading unit when said unit is engaged by said transfer member, said driving means being thereafter operative to move said transfer member transversely to said feed bar to shift the leading unit angularly relative to the second unit thereby to break any bond of adherence between said leading and said second units and to transfer the leading unit to a predetermined position.

15. A mechanism for feeding precut units of butter or like substance in individual succession, said mechanism comprising a conveyor having an oscillating feed bar feeding a line of units in face-to-face, abutting relation, a transfer member having a substance engaging surface to receive the leading unit from said bar, a shiftable abutment, means for actuating said shiftable abutment first in a direction opposite to said feed bar to contact the leading unit thereon and then in the same direction as the conveyor while still in contact with said unit thereby properly to position said unit upon said transfer member, driving means for moving said transfer member into initial engagement with said leading unit with the substance engaging surface of said member contacting a face of said unit at a point remote from the face abutting the second unit and extending at an angle to said contacting face, means included in said abutment actuating means for shifting said abutment out of contact with said leading unit when said unit is engaged by said transfer member, said driving means being thereafter operative to move said transfer member transversely to said feed bar to shift the leading unit angularly relative to the second unit thereby to break any bond of adherence between said leading and said second units and to transfer the leading unit to a predetermined position, and pressure applying means for clamping the units on said feed bar during its feeding movement to prevent slippage of the units relative to said bar.

16. A mechanism for feeding precut units of butter of like substance in individual succession, said mechanism comprising a conveyor having spaced side members for supporting a line of units thereon in face-to-face, abutting relation and a horizontally and vertically shiftable feed bar between said side members, said conveyor having spaced driving connections to said feed bar operative to cause the feed bar to lift the units of said line in succession, to feed the line of units forwardly and to redeposit the same on said side members, a shiftable transfer block having an opening therein to receive the forward end of said feed bar to permit the forward end of said feed bar to move therein to deposit the leading unit on said transfer block, said transfer block having a substance engaging surface adapted to initially engage a face of the leading unit at a point remote from the face abutting the next adjacent unit, means for shifting said transfer block along a fixed path transversely to the conveyor to cause the substance engaging surface of said block to engage and shift the leading unit angularly relative to the next adjacent unit thereby to break any adhesive bond between the leading unit and said next adjacent unit, and to feed the leading unit from said conveyor, and means operative during shifting of said transfer block for clamping said next adjacent unit on said conveyor side members.

MICHAEL J. MILMOE.
CLARENCE J. MALHIOT.